United States Patent

[11] 3,603,365

[72] Inventor Roscoe M. Bess
 Paris, Ill.
[21] Appl. No. 9,330
[22] Filed Feb. 6, 1970
[45] Patented Sept. 7, 1971
[73] Assignee Illinois Cereal Mills, Inc.
 Paris, Ill.

[54] DEGERMINATOR
 10 Claims, 8 Drawing Figs.
[52] U.S. Cl. .................................... 146/279,
 146/281, 146/302, 146/308
[51] Int. Cl. .................................... B02b 3/06
[50] Field of Search ........................... 146/279 H,
 281, 289, 293, 300, 302, 308, 221.5

[56] References Cited
 UNITED STATES PATENTS
 287,370 10/1883 Ewan ........................... 146/308 X
 2,108,655 2/1938 Dempsey ....................... 146/302 X Primary Examiner—Willie G. Abercrombie
Attorney—Strauch, Nolan, Neale, Nies & Kurz ABSTRACT: A degerminating machine having a screen casing within which a degerminating roll is rotatably mounted. The roll has a plurality of teats on its outer periphery with the teats aligned in helical rows extending along the length of the degerminating portion of the roll. Corn kernels fed into the machine at one end are cracked by the teats and the germs and fines are passed through the screen while the coarse starch material is discharged from the other end thereof.

INVENTOR.
ROSCOE M. BESS
BY Strauch, Nolan, Neale, Nies & Kurz
ATTORNEYS

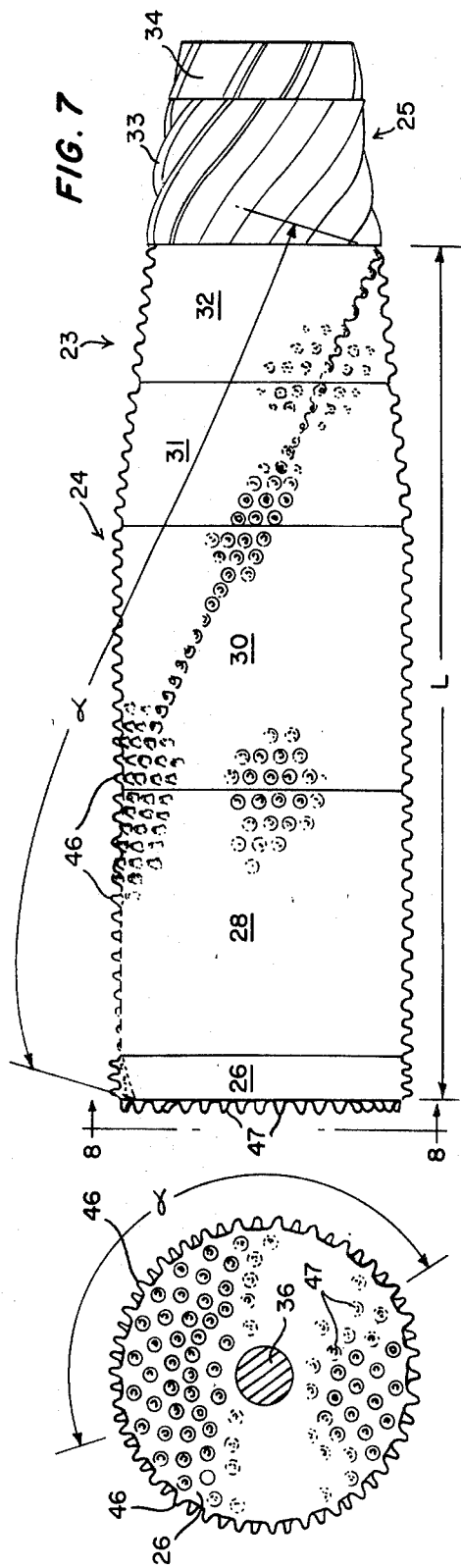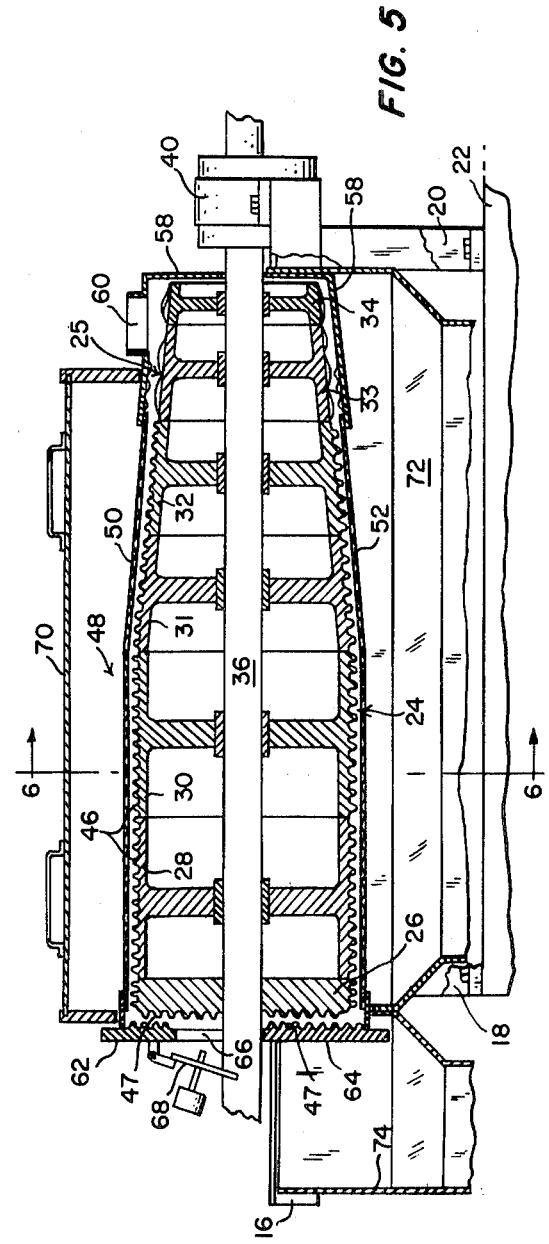

3,603,365

1

DEGERMINATOR

BACKGROUND OF THE INVENTION

This invention relates generally to degerminators used in corn and cereal mills and more particularly to an improved degerminator used to break and hull corn kernels and remove the germ therefrom in a more efficient manner than heretofore possible, thereby desirably providing a higher yield of whole, uncracked germs and starch products and a lower yield of feed products or fines.

Degerminators such as that illustrated in U. S. Pat. No. 2,108,655, issued to H. C. Dempsey have been known and used for quite some time in processing corn kernels to break and hull the corn and remove the germ therefrom. Degerminators of this type generally include a degerminating roll having a plurality of teats randomly arranged on its outer periphery and a casing surrounding the roll to provide an annular passage therebetween for the corn material to be treated. The casing generally has a plurality of teats which oppose those on the degerminating roll and cooperate therewith to break and grind the corn material. The casing also usually has a limited screen area to permit passage of fines of a predetermined size from the casing.

Basically, three types of products are produced by such degerminators, the germ of the corn which is emitted from the corn kernel after it is cracked, the coarse, tailstock starch products which eventually are used in preparing cereals, foods, beer, etc. and the fine thrustock products commonly used as feed for animals.

During the degerminating process, it is desirable that the germ removed from the cracked hull be maintained in a whole condition and not be cracked or disintegrated into the corn products, since it is the germ which contains the oil, the product which is the most valuable monetarily to a miller. The whole germ is removed from the degerminator along with the fine thrustock material and subsequently separated therefrom, after which the germ is dried and squeezed to extract the oil.

Similarly, the coarse starch products are worth more in terms of profit than the fine tailstock products.

Hence, for optimum efficiency, the degerminator should be capable of cracking the corn to remove the germ in a whole condition. The germ should not be ground or disintegrated into the starch and feed products since this would undesirably release the oil into these products and would reduce the overall oil yield of the corn. In addition, while the corn is to be cracked, the grinding and disintegrating action within the degerminator should be minimized, since such action reduces the yield of coarse tailstock products and produces an excessive amount of fines or thrustock, the least valuable product of the degerminating process. Furthermore, an excessive amount of fines tends to plug up the degerminator and thereby reduce its overall operating capacity.

Another important consideration is the fat content of the starch and feed products. If the germ is broken during the degerminating process, the oil is released into these products. Thus, not only will the oil yield be reduced, but the starch and feed products will have an undesirably high fat content resulting from the oil absorbed therein.

Known degerminators such as that illustrated in the Dempsey patent have not satisfactorily fulfilled the requirements noted above and generally have produced an excessive amount of grinding and crushing of the corn and breaking of the germ. This has resulted in an undesirable high yield of feed products and low yield of oil and starch products. In addition, because of the high yield of feed products, the capacity of the machine has been limited, and due to the breaking of the germ, the starch and feed products have possessed an undesirably high fat content.

SUMMARY OF THE INVENTION

Accordingly, a primary object of this invention resides in the provision of a novel, improved corn degerminator capable of operating at a high capacity while producing both a higher oil and starch yield and a lower feed yield than was possible with known conventional degerminators.

Another object resides in the provision of a novel improved corn degerminator comprising a rotatable roll having a plurality of teats formed on its outer periphery and a stationary screen of predetermined size surrounding the roll in closely spaced relation to the teats, with the teats being positioned and located to form a plurality of helical rows of teats and paths therebetween which extend along the length of the degerminating portion of the roll. As the roll rotates, the teats crack and hull the corn kernels to release the germs therefrom, which due to the large screen area surrounding the roll, are more quickly removed from the degerminator in a whole condition. In addition, the helical arrangement of the teats provide a high capacity degerminator by positively feeding the corn toward the outfeed end of the roll from which the tailstock products including the coarse-sized starch products and tailcorn (uncracked corn) are discharged. Any fines created by the rotating roll are quickly discharged through the large screen area and do not have an opportunity to plug up the degerminator and reduce the capacity thereof.

Still another object resides in the provision of a novel degerminator as discussed above in which the discharge end of the roll has an end section on which a plurality of axially extending teats are formed and the end-closure plate of the casing for the roll has a plurality of teats opposed to those on the end section of the roll. The closure plate has a gate-controlled discharge opening positioned above the axis of the roll so that, as the roll rotates, the tailstock products are polished by the cooperative relative action of the opposed end teats as the products are delivered to the discharge opening.

A further objection resides in the provision of a novel degerminator as described above in which the degerminating roll includes a plurality of separate replaceable roll sections on each of which the teats are positioned to form a plurality of helices. The roll sections are assembled together so that the teats are aligned in helical rows extending along the length of the roll.

Other objects and advantages will become apparent from reading the following detailed description of a preferred embodiment of the invention with reference to the accompanying drawings in which like parts are indicated by like numerals.

BRIEF DESCRIPTION OF THE DRAWING

FIG. 5 is a fragmentary sectional view taken along line 5—5 of FIG. 3;

FIG. 7 illustrates the degerminator roll with only a number of teats being shown sufficient to illustrate the helical arrangement of the teats along the roll; and FIG. 8 is an end view taken along line 8—8 of FIG. 7.

DETAILED DESCRIPTION OF THE INVENTION

Figure 1:
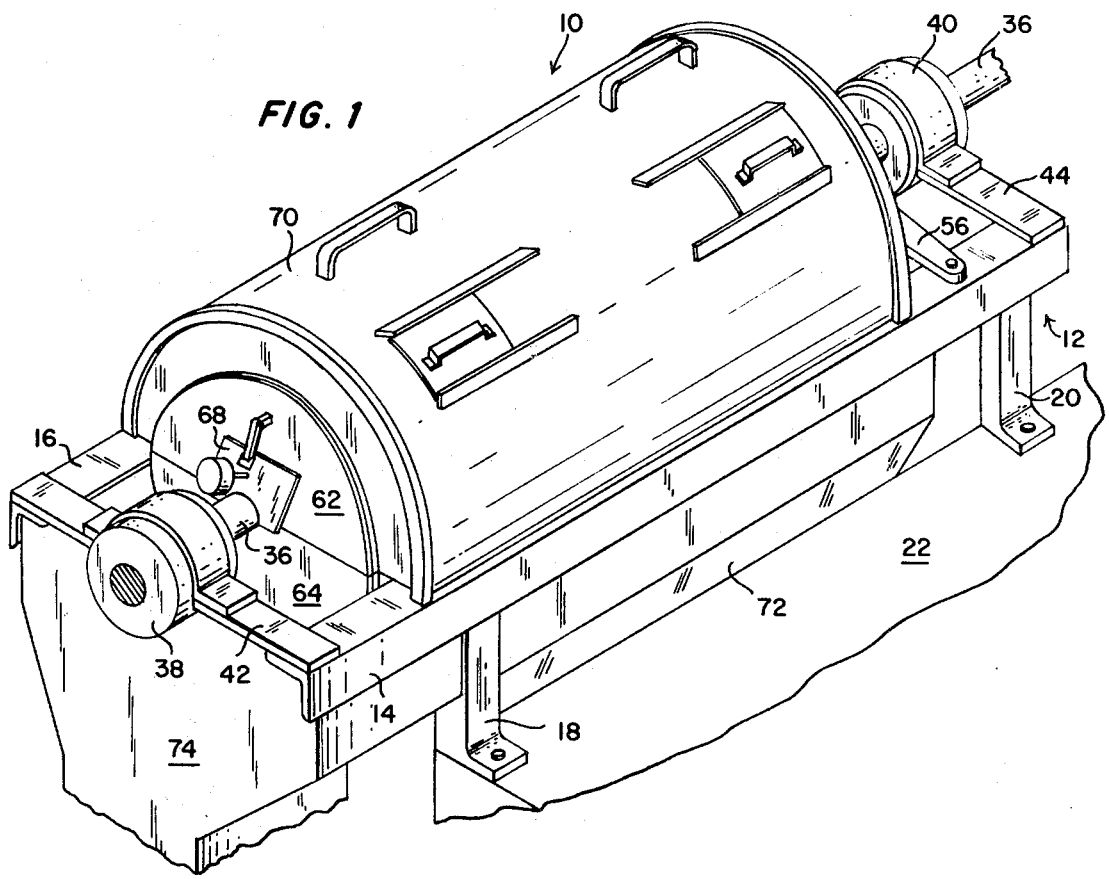
FIG. 1 is a general perspective view of the novel degerminator of the invention.
Figure 4:
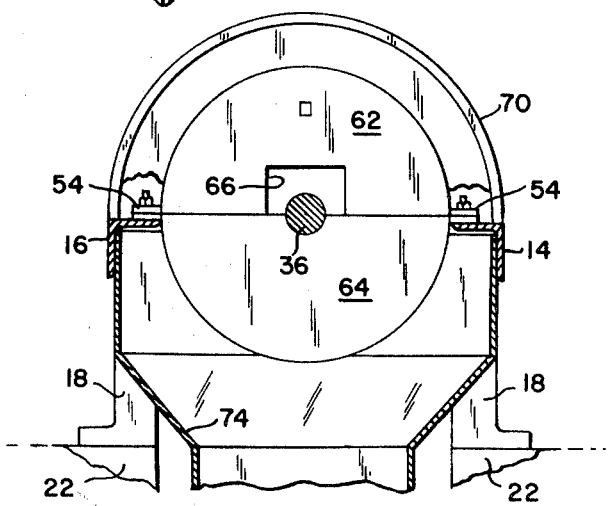
FIG. 4 is an end view of the tailstock discharge end of the degerminator taken generally along line 4—4 of FIG. 2.
Figure 3:
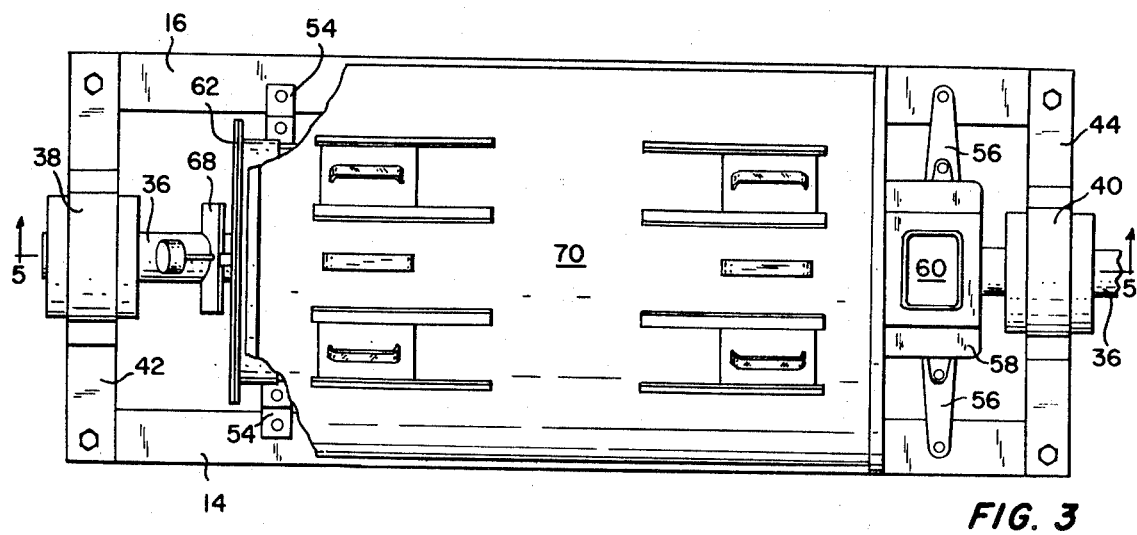
FIG. 3 is a partially fragmented top plan view of the degerminator of FIG. 1.
Figure 2:
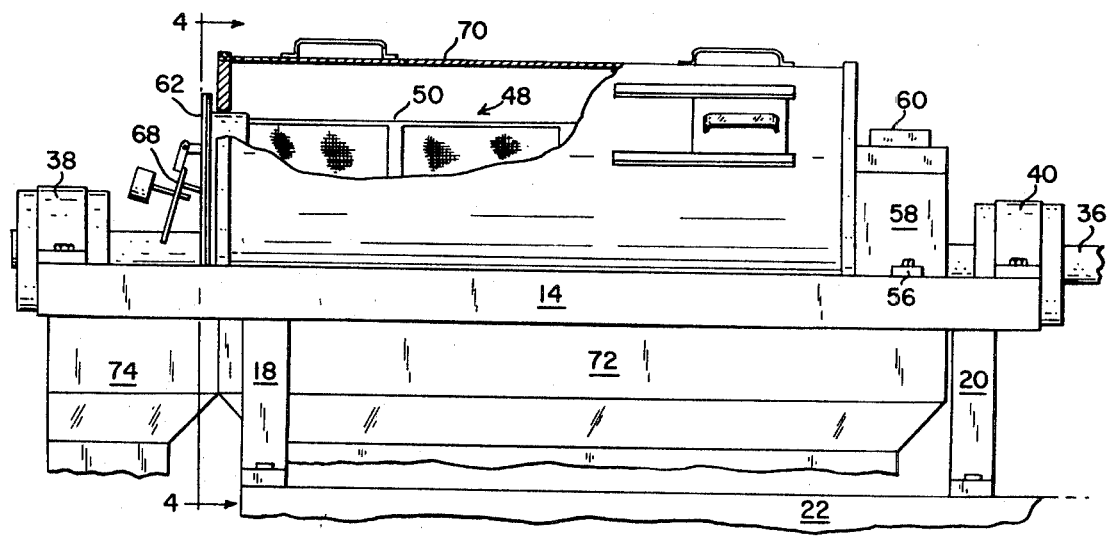
FIG. 2 is a partially fragmented front elevation view of the degerminator shown in FIG. 1.
Figure 6:
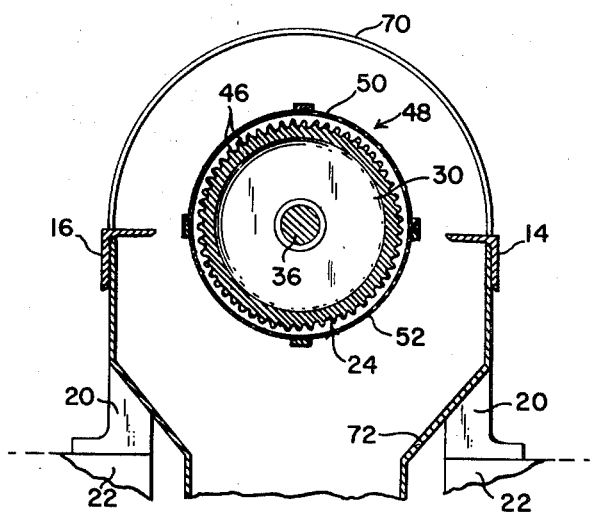
FIG. 6 is a sectional view taken along line 6—6 of FIG. 5.

Referring now to the drawings, the degerminator 10 is mounted on a frame 12 including a pair of spaced elongated angle iron members 14 and 16 each supported by a pair of legs 18 and 20 from a floor or other suitable platform 22.

Degerminator 10 comprises a roll 23 (FIG. 7) formed by degerminating portion 24 including a plurality of separable cylindrical sections 26, 28, 30, and tapered sections 31 and 32. The roll also has a feed portion 25, which includes screw-feed sections 33 and 34. All the roll sections are keyed on shaft 36 for rotation therewith, and should one of the sections become worn, it may be replaced without replacement of the entire roll. The shaft is mounted on bearing blocks 38 and 40 which are supported from the transverse plates 42 and 44 that extend between members 14 and 16. Shaft 36 may be rotated by a belt driven motor system (not shown).

A plurality of teats 46 is formed on the outer periphery of each of the roll sections 26, 28, 30, 31, and 32 in closely spaced relation and in such a manner that the teats are aligned in longitudinally extending helical rows to form helical paths of movement for the corn between adjacent rows of teats as shown in FIG. 7. The size of and spacing between teats 46 are selected to provide an optimum compromise for a mixture of 40 to 50 hybrid corns of various sizes and characteristics.

End-roll section 26 is also provided with a plurality of teats 47 on its end face, with the teats being closely spaced and generally arranged around concentric circles on the end face.

As discussed below, the circumferential angle $\alpha$ through which each helical row of teats extends around the degerminating roll portion 24 is very important toward obtaining optimum capacity and performance of the machine.

The feed-roll sections 33 and 34 at the infeed end of the machine are provided with helical vanes to rapidly feed the corn into the degerminating-roll sections.

A stationary casing 48 surrounds roll 23 and includes separable upper and lower perforated mating-screen sections 50 and 52 supported on angle members 14 and 16 by end brackets 54 and 56. The screen sections extend substantially throughout the length L and conform to the shape of roll portion 24 and are closely spaced from teats 46. At the infeed end of the machine, each screen section is connected to an imperforate housing piece 58 to which brackets 56 are connected and within which feed-roll sections 33 and 34 are received. The end-housing piece 58 for upper screen section 50 is provided with an opening 60 through which the kernels of corn are fed into the machine onto feed roll sections 33 and 34.

At the outfeed end of the machine, screen sections 50 and 52 are connected to end plates 62 and 64, respectively, and support brackets 54 are connected to the end plates. Upper plate 62 has a recess which forms a generally rectangular opening 66 above shaft 36, the opening permitting discharge of the coarse tailstock products from the screen casing. A gate valve 68 is connected to end plate 62 and may be adjusted to control the rate of discharge through opening 66.

The interior faces of end plates 62 and 64 are provided with teats 47 which cooperate with the opposing teats 47 on the end face of roll section 26 to polish the tailstock products which are discharged through opening 66.

A removable semicylindrical cover 70 rests on frame members 14 and 16 and completely encloses the upper screen section 50.

Lower screen section 52 is enclosed by a bottom chute or receptacle 72 connected to frame members 14 and 16, the chute 72 receiving the thrustock material discharged through the perforations in screen sections 50 and 52.

It is understood, of course, that the size of screen sections 50 and 52 is dependent upon the specific corn or mixture of corns being processed and will be changed to gain optimum efficiency for various types of corn with which the machine may be used. Basically, the size of the screen is dependent on the size of the corn kernels and should be sufficiently large to pass the germ of the corn and a predetermined size of fines.

Another chute 74 connected to frame members 14 and 16 is disposed adjacent the discharge end of the machine so that its upper open end receives the coarser tailstock material which will not pass through screen sections 50 and 52 and is, therefore, discharged through end opening 66.

In operation, the degerminator roll will be rotated at a speed of about 900 r.p.m. Corn kernels are delivered into the degerminator through opening 60 and are rapidly passed by feed-roll sections 33 and 34 into the annular area between the degerminating-roll portion 24 and screen sections 50 and 52. The helical rows of teats 46 then positively feed the corn toward the discharge end. As the roll rotates, the teats 46 strike the corn, thereby cracking and hulling it to release the germ therefrom, with most of the corn-cracking being done by roll sections 30, 31, and 32. These roll sections also produce an increased volume of products due to a grinding action on the cracked hull and starch products by the teats as they pass through the material and sweep it around screen sections 50 and 52.

The proper sized screen sections 50 and 52 permit the whole uncracked germs and fines of a preselected size to pass into collection chute 72. The germs are subsequently separated from the fines and treated to remove the corn oil therefrom.

The coarser starch products and larger uncracked corn continue to be conveyed along roll 23 toward the discharge end of the machine. The teats 46 on the periphery of roll sections 26 and 28 function primarily to scour or polish the coarse products which then accumulate at the discharge end. Similarly teats 47 on the opposed faces of roll section 26 and end plate sections 62 and 64 polish the coarse tailstock products as they are discharged through end opening 66 into chute 74 at a rate controlled by the setting of valve 68.

The described invention overcomes the disadvantages of known prior machines and accomplishes the objects initially set forth by providing a degerminating roll in which the teats are arranged in helical rows extending from end to end to positively feed the corn products toward the discharge end as the products are being treated by the teats. The perforated screen sections which substantially completely surround the teats 46 on the periphery of degerminating-roll portion 24 provide a high release area for the whole uncracked germs as soon as they are removed from the cracked kernels.

Additionally, the high screen area enables any fines created to be quickly removed from the machine and prevents the machine from plugging up and thereby becoming inoperative.

It has been determined that the circumferential angle $\alpha$ (FIGS. 7 and 8) through which each helical row of teats 46 extends around the degerminating roll portion 24 as it passes from end to end thereof throughout the length L of portion 24 is very important. For optimum performance, the angle $\alpha$ should lie in the range of 50° to 60° per foot of length of roll portion 24, i.e. for every foot of length of degerminating roll portion 24, the helix should extend through a circumferential distance of 50° to 60°.

In an actual machine constructed according to the invention in which the length L was about 37½ inches, the angle $\alpha$ was found to lie in the range of 150° to 180° and for optimum performance, was about 168°.

The angle $\alpha$ is significant in that it results in a proper rate of feed of the material through the machine to provide maximum operating capacity without plugging up the machine. If the angle $\alpha$ is below the lower limit, the feed rate through the machine is too slow and the overall capacity is reduced. Similarly, if the angle is above the upper limit, the feed rate through the machine is too fast, the material is not properly treated, and the machine will tend to plug up.

In contrast to known prior machines such as that illustrated in the Dempsey patent, the cracking of the corn is accomplished substantially entirely by the teats 46 on roll portion 24. There are no cooperating teats on the surrounding casing as in prior machines, hence, the cracking and grinding action is less abrasive and produces a higher yield of coarse tailstock products and whole germs and reduces the yield of fines or feed products. Also, because a lesser amount of germs are cracked, the fat content of the starch and feed products is desirably reduced.

For example, in comparing operation of the above described actual machine of the invention to that of a conventional machine which did not have the teats on the degerminator roll arranged in helical rows or the perforated screen area substantially completely surrounding the degerminating-roll portion 24, substantial differences were found. With both machines operating at the same speed of 900 r.p.m. and the same power input of 75 h.p. and having the same screen size, the machine of the invention provided an optimum capacity of about 250 bushels of corn per hour as compared to 80 bushels per hour obtained with the conventional machine. The machine of the invention also produced a 3- to 5- percent increase in starch products per bushel over that of the conventional machine and reduced by 3- to 5- percent the feed products obtained per bushel. Similarly, using the same screen size, the invention produced about 90 percent of the germs in a whole uncracked condition as compared to only about 50 percent uncracked germ produced by the conventional machine. As a result, about 1 pound of oil per bushel was obtained by using the machine of the invention as compared to about 0.7- pound oil per bushel obtained with the conventional machine. Stated another way, the higher yield of uncracked germs by the invention produced about 30 percent more oil which is the most valuable product obtained from the milling operation. As a consequence of the higher production of whole uncracked germs and increased oil yield, the starch and feed products obtained from the machine of the invention had a lower fat content.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A degerminator for processing grain such as corn or the like comprising a rotatable roll having an operable degerminating portion and a plurality of teats on the periphery of said portion, said teats being arranged in helical rows extending substantially throughout the length of said portion, a casing surrounding said roll, said casing having inlet and outlet ends and screen means positioned adjacent said teats, whereby the grain fed into said casing is cracked by the teats as the roll rotates and the larger tailstock products are conveyed by the helical rows of teats to the outlet end while the finer thrustock products are passed through the screen means.

2. A degerminator as defined in claim 1, wherein said screen means extends substantially throughout the length of said degerminating portion of said roll in surrounding relation to said teats to provide a large release area for said thrustock products.

3. A degerminator as defined in claim 1, wherein said teats are aligned in helical rows each of which passes through a circumferential angle around said degerminating portion of about 50° to 60° per foot of length of said portion.

4. A degerminator as defined in claim 3, wherein said degerminating portion is approximately 3 feet long and said circumferential angle is approximately 168°.

5. A degerminator as defined in claim 1, wherein said roll is formed by a plurality of separable roll sections each of which is replaceable independently of the others.

6. A degerminator as defined in claim 1, wherein opposing end faces of said casing and said roll at said outlet end have opposing teats which cooperate to polish the tailstock products discharged from said casing.

7. A degerminator for processing grain such as corn or the like comprising a frame, a roll rotatably mounted on said frame, said roll having an operable degerminating portion and a plurality of teats on the periphery of said portion, said teats being arranged in helical rows extending longitudinally substantially throughout the length of said portion, a stationary casing mounted on said frame in surrounding relationship with said roll, said casing having inlet and outlet ends and screen means which extends substantially throughout the length of said portion in closely spaced relation to said teats, whereby the grain fed into said casing is cracked by said teats as said roll rotates and the larger tailstock products are conveyed by the helical rows of teats to the outlet end of said casing while the finer thrustock products are passed through said screen means.

8. A degerminator as defined in claim 7, wherein said teats are aligned in helical rows each of which extends through a circumferential angle around said degerminating portion of about 50° to 60° per foot of length of said portion.

9. A degerminator as defined in claim 7, wherein said roll is formed by a plurality of separable roll sections each of which is replaceable independently of the others.

10. A degerminator as defined in claim 9, said roll section being mounted on a shaft which is rotatably mounted on said frame, said casing having an end outlet opening above said shaft, and opposing end faces on said casing and the outlet end section of said roll having a plurality of teats which cooperate to polish the tailstock products discharged through said end outlet opening.